(12) United States Patent
Katsuda et al.

(10) Patent No.: US 7,614,875 B2
(45) Date of Patent: Nov. 10, 2009

(54) GAS GENERATOR

(75) Inventors: Nobuyuki Katsuda, Hyogo (JP); Shingo Oda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/892,770

(22) Filed: Aug. 27, 2007

(65) Prior Publication Data

US 2008/0063993 A1    Mar. 13, 2008

(30) Foreign Application Priority Data

Aug. 28, 2006   (JP)   ............................. 2006-230326

(51) Int. Cl.
F23Q 2/32    (2006.01)

(52) U.S. Cl. .................... 431/253; 280/741; 280/728.1; 280/728.2

(58) Field of Classification Search ................. 411/21, 411/22, 24, 25, 32, 33, 76, 77, 78; 431/253; 280/728.1, 728.2, 741, 736; 102/530, 531, 102/202

See application file for complete search history.

(56) References Cited

U.S. PATENT DOCUMENTS

| | | | | |
|---|---|---|---|---|
| 699,617 | A | * | 5/1902 | Earl ............................. 411/76 |
| 3,091,795 | A | * | 6/1963 | Budwig .......................... 16/2.1 |
| 4,296,084 | A | * | 10/1981 | Adams et al. ................ 423/351 |
| 4,656,689 | A | * | 4/1987 | Dennis .......................... 16/2.2 |
| 4,749,075 | A | * | 6/1988 | Foster ....................... 414/525.1 |
| 4,762,437 | A | * | 8/1988 | Mitomi ......................... 403/11 |
| 4,839,937 | A | * | 6/1989 | Oikawa et al. ........... 174/153 G |
| 4,902,036 | A | * | 2/1990 | Zander et al. ................ 280/736 |
| 4,907,691 | A | * | 3/1990 | Foster ...................... 198/750.2 |
| 4,966,374 | A | * | 10/1990 | Oikawa et al. ............... 277/606 |
| 5,062,367 | A | * | 11/1991 | Hayashi et al. .............. 102/530 |
| 5,131,679 | A | * | 7/1992 | Novak et al. ................. 280/736 |
| 5,168,604 | A | * | 12/1992 | Boville .......................... 24/297 |
| 5,178,547 | A | * | 1/1993 | Bonas et al. ................... 439/34 |
| 5,200,574 | A | * | 4/1993 | Cunningham et al. ........ 102/530 |
| 5,234,247 | A | * | 8/1993 | Pacer ........................... 296/91 |
| 5,236,675 | A | * | 8/1993 | Swain et al. ................. 422/305 |
| 5,269,560 | A | * | 12/1993 | O'Loughlin et al. ......... 280/736 |
| 5,275,575 | A | * | 1/1994 | Cahaly et al. ................ 439/188 |
| 5,346,347 | A | * | 9/1994 | Barikosky et al. ............. 411/19 |
| 5,387,008 | A | * | 2/1995 | Lauritzen et al. ............ 280/741 |

(Continued)

FOREIGN PATENT DOCUMENTS

JP    8-13625 B2    2/1996

(Continued)

*Primary Examiner*—Kenneth B Rinehart
*Assistant Examiner*—Jorge Pereiro
(74) *Attorney, Agent, or Firm*—Birch, Stewart, Kolasch and Birch, LLP

(57) ABSTRACT

A gas generator includes, a housing having a gas discharge port; at least one combustion chamber accommodating a gas generating agent therein; a cylindrical filter disposed between the gas discharge port and the combustion chamber; and at least one ignition device for igniting and combusting the gas generating agent, each device comprising an igniter assembly in which an electric igniter is enclosed and fixed by a metal member and a resin portion. The igniter assembly has, in the resin portion, a holder accommodation space disposed over an opening formed in a bottom portion of the housing, and fixed by a holder inserted from the outside into the opening. An inner wall surface of the holder accommodation space has concave and convex portions that engage convex and concave portions of the holder, so that the igniter assembly is fixed without being welded to the bottom portion of the housing.

10 Claims, 3 Drawing Sheets

U.S. PATENT DOCUMENTS

| | | | | |
|---|---|---|---|---|
| 5,462,307 | A | * | 10/1995 | Webber et al. ............... 280/737 |
| 5,531,473 | A | * | 7/1996 | Rink et al. .................... 280/737 |
| 5,558,366 | A | * | 9/1996 | Fogle et al. .................. 280/736 |
| 5,584,505 | A | * | 12/1996 | O'Loughlin et al. ........ 280/737 |
| 5,590,900 | A | * | 1/1997 | Duran et al. ............. 280/728.2 |
| 5,592,720 | A | * | 1/1997 | Sasakawa et al. ............. 24/453 |
| 5,645,296 | A | * | 7/1997 | Okada et al. ................. 280/736 |
| 5,733,135 | A | * | 3/1998 | Kennedy et al. ............. 439/188 |
| 5,746,618 | A | * | 5/1998 | Gauker ....................... 439/352 |
| 5,881,989 | A | * | 3/1999 | O'Brien et al. ............. 248/634 |
| 5,893,583 | A | * | 4/1999 | Blumenthal et al. ......... 280/737 |
| D410,194 | S | * | 5/1999 | Hilton et al. ................. D8/382 |
| 5,924,831 | A | * | 7/1999 | Ricks et al. .................. 411/508 |
| 5,944,545 | A | * | 8/1999 | Willhelm et al. ............ 439/188 |
| 5,947,509 | A | * | 9/1999 | Ricks et al. ............. 280/728.2 |
| 6,056,314 | A | * | 5/2000 | Shirk et al. .............. 280/728.2 |
| 6,073,963 | A | * | 6/2000 | Hamilton et al. ............ 280/741 |
| 6,123,746 | A | * | 9/2000 | Alvin et al. .................... 55/502 |
| 6,164,208 | A | * | 12/2000 | Hsu et al. ................. 102/202.5 |
| 6,213,800 | B1 | * | 4/2001 | Mramor ....................... 439/188 |
| 6,217,388 | B1 | * | 4/2001 | Francis ................. 439/620.07 |
| 6,250,665 | B1 | * | 6/2001 | Sutherland et al. ....... 280/728.2 |
| 6,257,910 | B1 | * | 7/2001 | Mramor ....................... 439/188 |
| D449,238 | S | * | 10/2001 | Ancona et al. ............ D10/46.2 |
| 6,301,892 | B1 | * | 10/2001 | Narumi et al. ................. 60/634 |
| 6,422,897 | B1 | * | 7/2002 | Odorfer ....................... 439/510 |
| 6,435,790 | B1 | * | 8/2002 | Ichikawa ...................... 411/349 |
| 6,508,175 | B1 | * | 1/2003 | Avetisian ............... 102/202.14 |
| 6,544,060 | B2 | * | 4/2003 | Wakui et al. ................. 439/188 |
| 6,644,198 | B1 | * | 11/2003 | Avetisian et al. ....... 102/202.14 |
| 6,695,343 | B1 | * | 2/2004 | Christiansen et al. ....... 280/731 |
| 6,718,884 | B1 | * | 4/2004 | Yabuta et al. ............... 102/530 |
| 6,763,764 | B2 | * | 7/2004 | Avetisian et al. ....... 102/202.14 |
| 6,815,615 | B1 | * | 11/2004 | Wagner et al. ............... 174/667 |
| 6,886,856 | B2 | * | 5/2005 | Canterberry et al. ........ 280/741 |
| 6,964,430 | B2 | * | 11/2005 | Blackburn et al. ........... 280/741 |
| 7,077,428 | B2 | * | 7/2006 | Barker et al. ................ 280/736 |
| 7,125,041 | B2 | * | 10/2006 | Kato et al. .................... 280/736 |
| 2002/0053788 | A1 | * | 5/2002 | Iwai et al. .................... 280/736 |
| 2002/0154494 | A1 | * | 10/2002 | Nagamine et al. ........... 361/816 |
| 2003/0015452 | A1 | * | 1/2003 | Su .............................. 206/524.8 |
| 2003/0137139 | A1 | * | 7/2003 | Iwai et al. .................... 280/741 |
| 2003/0210546 | A1 | * | 11/2003 | Chin ............................. 362/249 |
| 2004/0084881 | A1 | * | 5/2004 | Helmstetter ............... 280/728.2 |
| 2004/0175250 | A1 | * | 9/2004 | Yoneoka ....................... 411/45 |
| 2004/0195813 | A1 | * | 10/2004 | Canterberry et al. ........ 280/741 |
| 2004/0244624 | A1 | * | 12/2004 | Harada et al. ............. 102/202.9 |
| 2004/0245753 | A1 | * | 12/2004 | Kato et al. .................... 280/736 |
| 2005/0052000 | A1 | * | 3/2005 | Barker et al. .............. 280/728.2 |
| 2005/0121894 | A1 | * | 6/2005 | Brisighella et al. .......... 280/741 |
| 2005/0126416 | A1 | * | 6/2005 | Clark ...................... 102/202.12 |
| 2005/0127649 | A1 | * | 6/2005 | Smith .......................... 280/741 |
| 2005/0151357 | A1 | * | 7/2005 | Yamazaki .................... 280/741 |
| 2005/0161923 | A1 | * | 7/2005 | Hirooka et al. .............. 280/741 |
| 2006/0082113 | A1 | * | 4/2006 | Smith et al. .................. 280/741 |
| 2006/0131853 | A1 | * | 6/2006 | Iwai et al. .................... 280/736 |
| 2006/0151977 | A1 | * | 7/2006 | Yamazaki .................... 280/736 |
| 2006/0249938 | A1 | * | 11/2006 | Matsuda et al. .............. 280/736 |
| 2007/0001439 | A1 | * | 1/2007 | Matsuda et al. .............. 280/741 |
| 2007/0024038 | A1 | * | 2/2007 | Numoto et al. .............. 280/736 |
| 2007/0095236 | A1 | * | 5/2007 | Maruyama et al. ........ 102/202.9 |

FOREIGN PATENT DOCUMENTS

JP 8-22662 B2 3/1996

* cited by examiner

GAS GENERATOR

This nonprovisional application claims priority under 35 U.S.C. §119(a) on Patent Application No. 2006-230326 filed in Japan on 28 Aug. 2006, which is incorporated by reference.

BACKGROUND OF INVENTION

1. Field of Invention

The present invention relates to a gas generator and a method of fixing an igniter assembly suitable as a method of assembling the gas generator.

2. Description of Related Art

In airbag apparatuses installed on automobiles, gas generators provided with a gas generating agent as a gas generation source have been used and electric igniters for igniting and combusting the gas generating agent is disposed. As the electric igniters, the igniters fixed by a metal member and a resin have generally been used, and the igniters are mounted by fixing the metal member to the housing of the gas generator by welding.

JP-A No. 8-22662 and JP-A No. 8-13625 show an air bag inflator.

SUMMARY OF INVENTION

The present invention relates to a gas generator including:

a housing having a gas discharge port;

one or two or more combustion chambers accommodating a gas generating agent therein;

a cylindrical filter disposed between the gas discharge port and the combustion chamber; and one or two or more ignition devices for igniting and combusting the gas generating agent, each device comprising an igniter assembly in which an electric igniter is enclosed and fixed by a metal member and a resin portion, the igniter assembly having a holder accommodation space in the resin portion, being disposed so that the holder accommodation space disposed over, or directly faces, an opening formed in a bottom portion of the housing, the igniter assembly being fixed by a holder inserted from the outside into the opening; and an inner wall surface of the holder accommodation space having a concave portion and a convex portion, the holder having a convex portion and a concave portion, and the concave and convex portion of the inner wall surface of the holder accommodation space and the convex and concave portion of the holder engaging with each other, so that the igniter assembly is fixed without welding to the bottom portion of the housing.

The present invention also relates to a method of fixing one or two or more igniter assemblies without employing a welding method to a housing of a gas generator in which a housing is obtained by joining and integrating a closure shell having a opening for fixing the ignition device and a diffuser shell having a gas discharge port, the ignition device has an electric igniter enclosed and fixed by a metal member and a resin portion and the resin portion has a holder accommodation space, comprising steps of disposing the igniter assembly so that the holder accommodation space is disposed over the opening of the closure shell, and inserting a holder into the opening from the outside and fixing the igniter assembly to a bottom surface of the closure shell, the steps causing a concave portion and a convex portion of an inner wall surface of the holder accommodation space to engage with a convex portion and a concave portion of the holder, so that the igniter assembly is fixed without welding to a bottom portion of the housing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
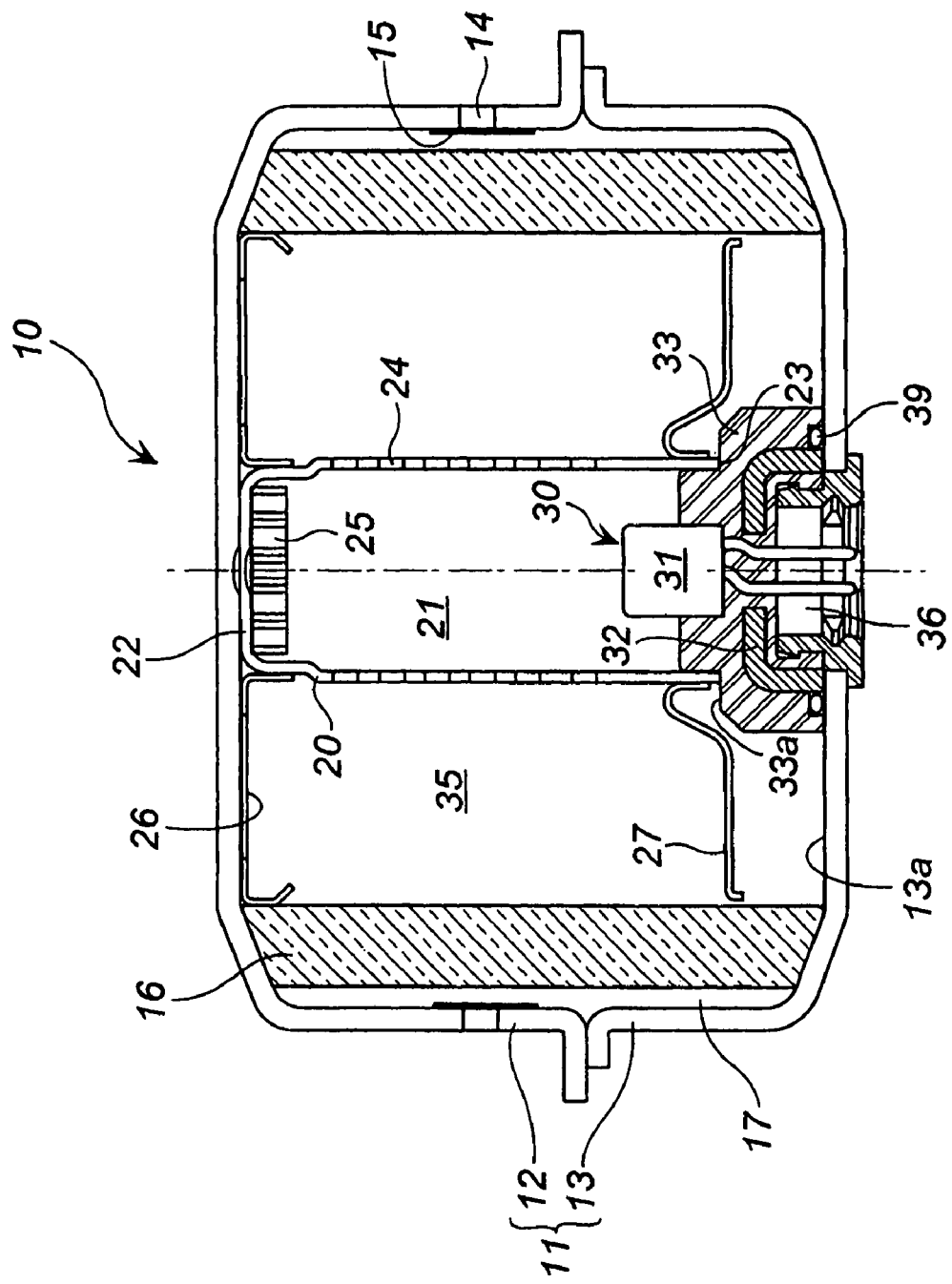
FIG. 1 shows a vertical end surface view of a gas generator in accordance with the present invention.

When an igniter is fixed to a housing by a welding method, there is a risk that the welding heat causes the resin portion of the igniter to be deformed or the ignition agent of the igniter to be combusted.

The present invention relates to a gas generator in which an igniter assembly is fixed to a housing, without applying a welding method.

Further, the present invention relates to a method of fixing an igniter assembly to a housing.

In the gas generator in accordance with the present invention, the igniter assembly is fixed to the bottom portion of the housing by using a holder, without applying a welding method such as resistance welding or laser welding, and the present invention is applicable to a single-type gas generator having a single combustion chamber filled with the gas generating agent and a single igniter and a dual-type gas generator having two combustion chambers filled with the gas generating agent and two igniters. The space left after the holder has been inserted into the holder accommodation space serves as a connection space for a connector which is connected with a power source via a lead wire.

The concave and convex portions formed on the inner wall surface of the holder accommodation space may be a combination of a plurality of groove continuous in the circumferential direction, or a combination of a plurality of independent concave portions and convex portions, or a combination of grooves and independent concave portions and convex portions.

No specific limitation is placed on a shape of the holder, and the holder may be of any shape, provided that it can be inserted into the holder accommodation space and that a concave portion and a convex portion on the inner wall surface of the holder accommodation space can be engaged with a convex portion and a concave portion of the holder. Because the holder is inserted into the holder accommodation space and the inner wall surface of the space is made from a resin, the holder itself may be preferably made from a resin.

The present invention further relates to the gas generator, wherein the holder has an annular substrate and hook portions provided to protrude in at least two locations on the annular substrate, the hook portions are made from an elastic material and have a plate-like shape having a concave portion and a convex portion, and distal end portions of the hook portions are provided to protrude and expand in the direction of an outer circumferential edge of the annular substrate;

the annular substrate of the holder is inserted from the outside into the opening formed in the bottom portion of the housing; and the concave and convex portions on the inner wall surface of the holder accommodation space and the convex and concave portions of the hook portions engage with each other, and a force that acts to expand outwardly the distal end sections of the hook portions applies pressure to the inner wall surface of the holder accommodation space, whereby the igniter assembly is fixed without welding to the bottom portion of the housing.

It is meant that due to the outer elastic expansion of distal ends of the hook portions, the hook portions press against the inner wall surface of the holder accommodation space, so that the igniter assembly is fixed without welding to the bottom portion of the housing.

In the holder, the hook portions are provided in at least two locations on the annular substrate. For example, the holder has two hook portions in the opposite locations or three, four, or more independent hook portions that are distributed equidistantly in the circumferential direction.

For example, the distance between distal end portions of the two hook portions formed in the opposite locations is more than the spacing of the holder accommodation space. As a result, when the holder is inserted into the holder accommodation space, where the two hook portions are inserted, while being squeezed from both sides toward each other so that the distance therebetween is reduced, the two hook portions that are squeezed toward each other then deform and expand outwardly. As a result, due to the force that acts to expand the distal end sections of the hook portions outwardly, as described hereinabove, a pressure is applied to the inner wall surface of the holder accommodation space.

As a consequence, in addition to the mutual engagement of the concave and convex portions of the hook portions and the inner wall surface of the holder accommodation space, the hook portions press against the inner wall surface of the holder accommodation space, thereby further increasing the fixing strength of the igniter assembly.

The present invention further relates to the gas generator, wherein the holder has a first annular substrate, a second annular substrate that is formed on the first annular substrate and has a diameter less than that of the first annular substrate, and hook portions provided to protrude in at least two locations on the second annular substrate, the hook portions are made from an elastic material and have a plate-like shape having a concave portion and a convex portion, and distal end portions of the hook portions are provided to protrude and expand outwardly in the direction of an outer circumferential edge of the second annular substrate;

a step surface between the first annular substrate and the second annular substrate abuts against an outer surface of the bottom portion of the housing, and the second annular substrate is inserted into the opening formed in the bottom portion of the housing; and the concave and convex portions on the inner wall surface of the holder accommodation space and the convex and concave portions of the hook portions engage with each other, and a force that acts to expand outwardly the distal end sections of the hook portions applies pressure to the inner wall surface of the holder accommodation space, whereby the igniter assembly is fixed without welding to the bottom portion of the housing.

By using a holder having a first annular plate, a second annular plate, and hook portions, it is possible to facilitate the operation of attaching to the housing bottom portion. Further, in addition to the mutual engagement of concave and convex portions of the hook portions and the inner wall surface of the holder accommodation space, the hook portions press against the inner wall surface of the holder accommodation space, thereby further increasing the fixing strength of the igniter assembly.

The present invention further relates to the gas generator, wherein a cup member that defines a agent accommodation chamber is provided, the cup member is disposed such that a bottom surface of the cup member abuts against a top surface of the housing, and a circumferential edge of an opening of the cup member abuts against the igniter collar.

By disposing a cup member in the above-described manner, the cup member can enhance the fixing strength of the igniter assembly provided by the holder. The agent accommodation chamber formed by the cup member is, for example, a transfer charge accommodation chamber communicating with the combustion chamber in the case of a single-type gas generator, and one of the two combustion chambers accommodating the gas generating agent in the case of a dual-type gas generator.

With the method of fixing an igniter assembly in accordance with the present invention, an igniter assembly is fixed to a bottom portion of a housing by using a holder, without applying a welding method, and such method can be employed to both assembling processes of a single-type gas igniter that has a single combustion chamber filled with a gas generating agent and a single igniter and a dual-type gas generator having two combustion chambers filled with the gas generating agent and two igniters.

The concave and convex portions formed on the inner wall surface of the holder accommodation space may be a combination of a plurality of groove continuing in the circumferential direction, or a combination of a plurality of independent concave portions and convex portions, or a combination of grooves and independent concave portions and convex portions.

No specific limitation is placed on the holder shape, and the holder may be of any shape, provided that it can be inserted into the holder accommodation space and that the concave and convex portions on the inner wall surface of the holder accommodation space can be engaged with the convex and concave portions of the holder. Because the holder is inserted into the holder accommodation space and the inner wall surface of the space is made from a resin, the holder itself may be made from a resin.

The present invention further relates to the method of fixing an igniter assembly, wherein as the holder, one having an annular substrate and hook portions provided to protrude in at least two locations on the annular substrate is used, the hook portions being made from an elastic material and having a plate-like shape having a concave portion and a convex portion, and distal end portions of the hook portions being provided to protrude and expand in the direction of an outer circumferential edge of the annular substrate;

in the step of fixing the igniter assembly to the bottom surface of the closure shell, the holder is inserted so that the concave and convex portions on the inner wall surface of the holder accommodation space engage with the convex and concave portions of the hook portions, and a force that acts to expand outwardly the distal end sections of the hook portions applies pressure to the inner wall surface of the holder accommodation space, whereby the igniter assembly is fixed to a bottom surface of the closure shell.

The holder has the hook portions in at least two locations on the annular substrate. For example, the holder has two hook portions in the opposite locations or three, four, or more independent hook portions that are disposed equidistantly in the circumferential direction.

For example, the distance between distal end sections of the two hook portions formed in the opposite locations is more than the spacing of the holder accommodation space. As a result, when the holder is inserted into the holder accommodation space, where the two hook portions are inserted, while being squeezed from both sides toward each other so that the distance therebetween is reduced, the two hook portions that are squeezed toward each other are deformed to expand outwardly. As a result, due to the force that acts to expand the distal end sections of the hook portions outwardly, as described hereinabove, a pressure is applied to the inner wall surface of the holder accommodation space.

As a consequence, in addition to the mutual engagement of concave and convex portions of the hook portions and the inner wall surface of the holder accommodation space, the hook portions press against the inner wall surface of the holder accommodation space, thereby further increasing the fixing strength of the igniter assembly.

The present invention further relates to the method of fixing an igniter assembly, wherein as the holder, one having a first annular substrate, a second annular substrate that is formed on the first annular substrate and has a diameter less than that of the first annular substrate, and hook portions provided to protrude in at least two locations on the second annular substrate is used, the hook portions being made from an elastic material and having a plate-like shape with a concave portion and a convex portion, and distal end portions of the hook portions being protruded so as to expand in the direction of an outer circumferential edge of the second annular substrate, in the step of fixing the igniter assembly to the bottom surface of the closure shell, the holder is inserted so that a step surface between the first annular substrate and second annular substrate abut against an outer surface of the bottom portion of the housing and the concave and convex portions on the inner wall surface of the holder accommodation space and the convex and concave portions of the hook portions are engaged with each other, and a force that acts to expand outwardly the distal end sections of the hook portions applies pressure to the inner wall surface of the holder accommodation space, whereby the igniter assembly is fixed to the bottom surface of the closure shell.

By using a holder having a first annular plate, a second annular plate, and hook portions, it is possible to facilitate the operation of attaching to the housing bottom portion. Further, in addition to the mutual engagement of concave and convex portions of the hook portions and the inner wall surface of the holder accommodation space, the hook press against the inner wall surface of the holder accommodation space, thereby further increasing the fixing strength of the igniter assembly.

The present invention further relates to the method for fixing an igniter assembly, further including a step of, after the step of fixing the igniter assembly to the bottom surface of the closure shell, disposing a cup member that forms an agent accommodation chamber such that the bottom surface thereof abuts against a top surface of the housing and a circumferential edge of an opening thereof abuts against the igniter collar.

By disposing a cup member in the above-described manner, the cup can enhance the fixing strength of the igniter assembly provided by the holder. The agent accommodation chamber formed by the cup member is, for example, a transfer charge accommodation chamber communicating with the combustion chamber in the case of a single-type gas generator, and one of the two combustion chambers accommodating the gas generating agent in the case of a dual-type gas generator.

With the gas generator in accordance with the present invention, when an igniter assembly is attached to a housing, the igniter assembly can be attached by inserting a holder, without the necessity to apply the conventional welding method. Therefore, the assembling process can be simplified, and thermal deformation of the resin of the igniter assembly or combustion of the ignition agent caused by heat during welding is prevented.

EMBODIMENTS OF INVENTION (1) Gas Generator

Figure 2:
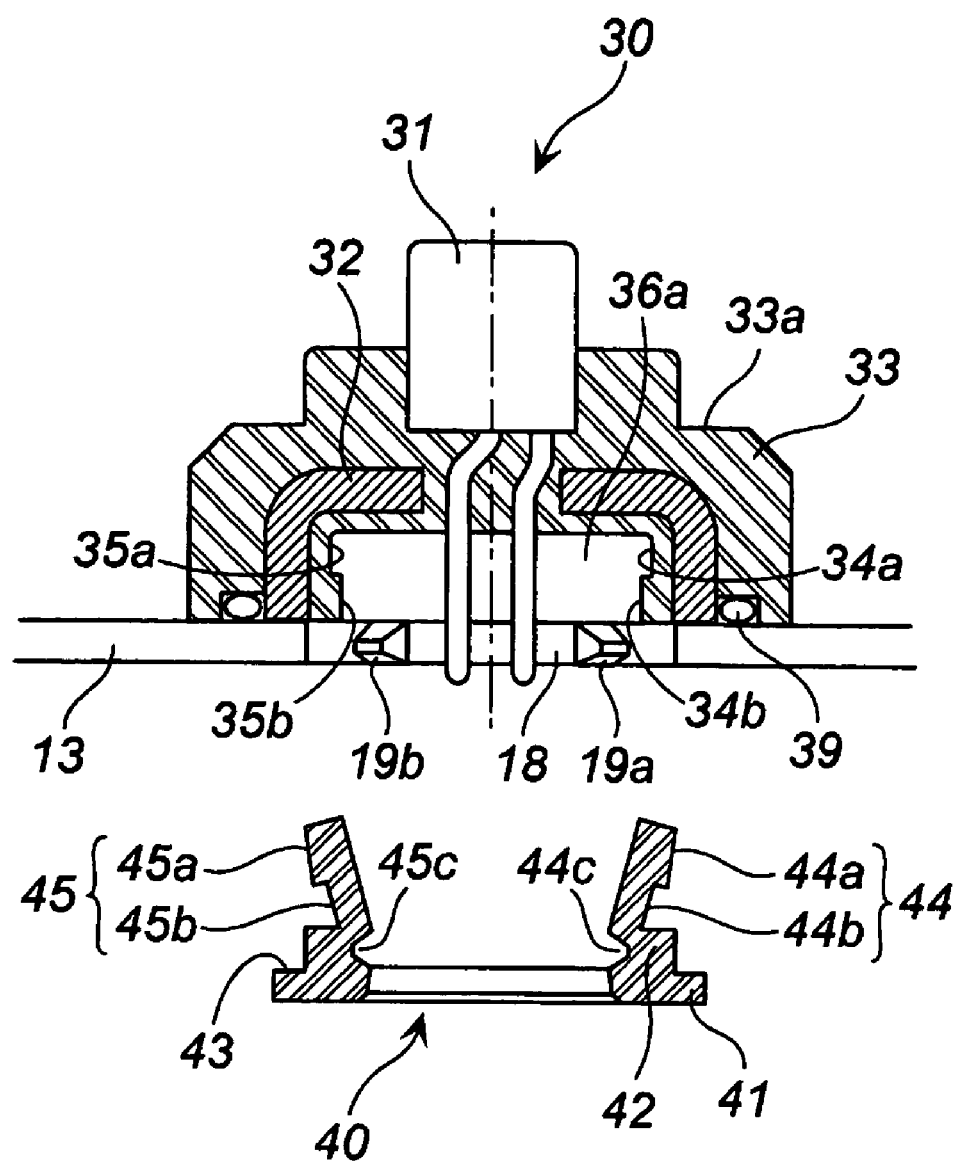
FIG. 2 illustrates a method of fixing an igniter assembly in the gas generator of FIG. 1.

An embodiment of the gas generator in accordance with the present invention will be described below with reference to FIG. 1 and FIG. 2. FIG. 1 is a vertical sectional view of a gas generator 10, and FIG. 2 is a vertical sectional view for illustrating a fixing state of an igniter assembly and a holder.

A housing 11 that forms an outer shell of the gas generator 10 is obtained by joining and integrating a diffuser shell 12 and a closure shell 13 by welding. The diffuser shell 12 has a plurality of gas discharge ports 14, and the gas discharge ports 14 are closed from the inside with a closing member 15 such as an aluminum tape or a stainless steel tape.

A cylindrical filter 16 is disposed inside the housing 11. A gap 17 is formed between the cylindrical filter 16 and gas discharge ports 14 as well as the closing member 15.

A cup member 20 is disposed in the central section of the housing 11. The inside of the cup member serves as a transfer charge accommodation chamber 21 and contains a transfer charge (not shown in the drawing). A plurality of flame-transferring holes 24 are formed in the peripheral surface of the cup member 20, and a cushion member 25 is disposed on a top surface 22.

A combustion chamber 35 is defined between the cup member 20 and the cylindrical filter 16 and the chamber is filled with a gas generating agent (not shown in the drawing). A retainer 26 on the top surface of the combustion chamber 35 is a short-pass preventing member that prevents the gas generated by the combustion of the gas generating agent from leaking from the contact surface of the filter 16 and the diffuser shell 12. A retainer 27 on the bottom surface serves to adjust the combustion chamber volume according to the amount of the gas generating agent loaded therein.

An opening 18 is formed in the central portion of a bottom surface 13a of the closure shell 13, and the igniter assembly 30 is fixed to the bottom surface 13a, being disposed over the opening 18. Two convex portions 19a, 19b are formed at the peripheral surface of the opening 18.

In the igniter assembly 30, an electric igniter 31 having a pair of electroconductive pins is enclosed in and fixed by a cup-shaped metal member 32 having a hole for the electroconductive pins in the bottom and a resin portion 33. An O-ring 39 is inserted into an annular groove defined by the metal member 32, resin member 33, and bottom surface 13a.

A step is provided to the outer surface of the resin portion 33, and an annular step surface 33a is obtained. Inside the resin portion 33, a holder accommodation space 36a (see FIG. 2) is formed before a holder 40 is inserted, and after the holder 40 is inserted, a connector connection space 36 (see FIG. 1) is formed.

The holder accommodation space 36a directly opposes the opening 18. A concave portion 34a and a convex portion 34b, and a concave portion 35a and a convex portion 35b are formed in opposing positions on the inner wall surface of the holder accommodation space 36a.

The holder 40 has a first annular substrate 41, a second annular substrate 42 that is stacked on the first annular substrate 41 so as to form a concentric circle and has a diameter less than that of the first annular substrate 41, and plate-like hook portions 44, 45 provided to protrude in two opposing locations on the second annular substrate 42. Due to the difference in diameter between the first annular substrate 41 and the second annular substrate 42, an annular step surface 43 is formed.

The entire holder 40 is made from a resin. The hook portion 44 has an outer convex portion 44a, an outer concave portion 44b, and an inner concave portion 44c. The hook 45 has an outer convex portion 45a, an outer concave portion 45b, and an inner concave portion 45c. Because both the hook portion 44 and the hook portion 45 are provided to protrude and be bent outwardly (in the circumferential edge direction of the second substrate 42), before the hook portions are inserted into the holder accommodation space 36a, the distance between the two hook portions 44, 45 (the distance between the outer convex portion 44a and the outer convex portion 45a) is larger than the maximum inner diameter of the holder accommodation space 36a.

The holder 40 is inserted into the holder accommodation space 36a in a state in which the annular step surface 43 abuts against the outer surface of the bottom portion of the closure shell 13, and the second annular substrate 42 is fitted to the opening 18.

The outer convex portion 44a, outer concave portion 44b, and inner concave portion 44c of the hook portion 44 are respectively engaged with the concave portion 34a and convex portion 34b of the inner wall surface of the holder accommodation space 36a, and the convex portion 19a of the circumferential edge of the opening. The outer convex portion 45a, outer concave portion 45b, and inner concave portion 45c of the hook portion 45 are respectively engaged with the concave portion 35a and convex portion 35b of the inner wall surface of the holder accommodation space 36a, and the convex portion 19b of the circumferential edge of the opening. Because the hook portions 44, 45 deform to expand outwardly, the hook portions 44, 45 press against the inner wall surface of the holder accommodation space 36a, and the resultant pressing force increases the joining force produced by the above-described engagement of the concave and convex portions.

In the cup member 20, the top surface 22 abuts against the top surface of the diffuser shell 12, and a circumferential edge 23 of the opening abuts against the annular step surface 33a of the resin portion 33. As a result, the resin portion 33 is pushed from above by the cup member 20, and this pushing force enhances the fixing of the igniter assembly 30 to the closure shell 13.

In the gas generator 10, the igniter assembly 30 is fixed to the closure shell 13 by the holder 40, without welding.

(2) Method for Fixing the Igniter Assembly

An embodiment of the method for fixing the igniter assembly in accordance with the present invention will be described below with reference to FIG. 3. FIGS. 3(a) to (d) illustrate steps of the method of fixing the igniter assembly to the gas generator. Only part of the closure shell 13 is shown in the drawings to facilitate the understanding of the assembling method.

Figure 3D:
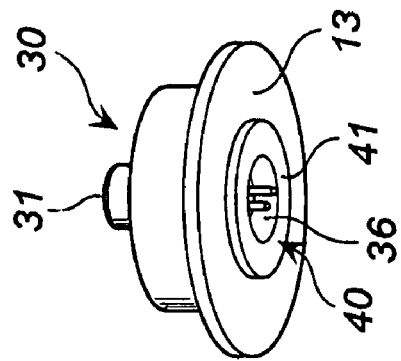
FIG. 3 is an explanatory drawing illustrating a method of assembling the gas generator shown in FIG. 1.
Figure 3C:
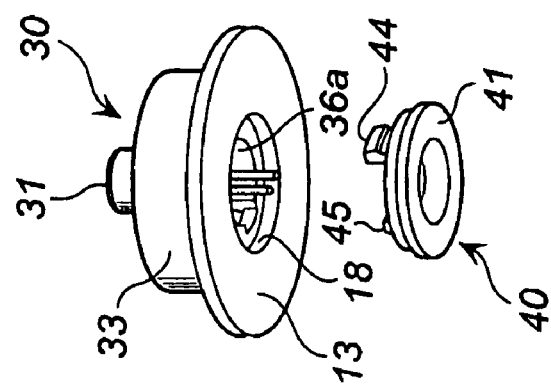
Figure 3B:
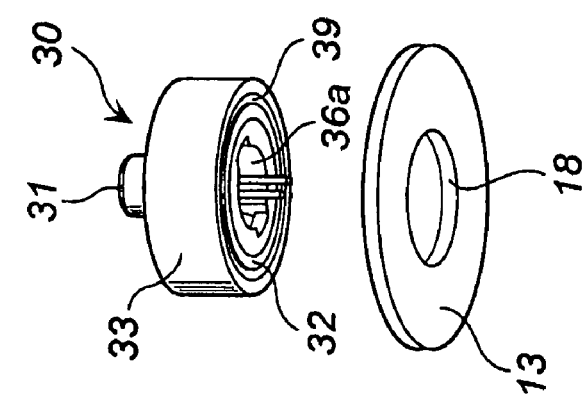
Figure 3A:
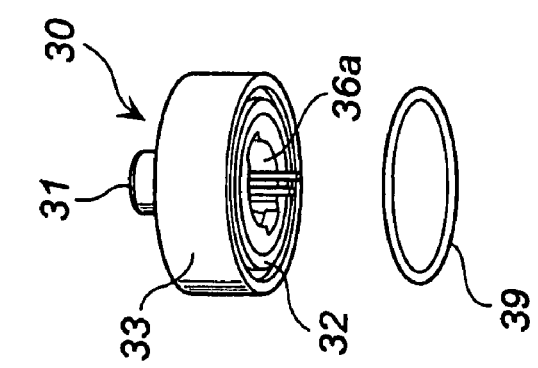

The step shown in FIG. 3(a) is a preparation step performed prior to attaching the igniter assembly 30 to the closure shell 13.

In this step, an O-ring for imparting moisture resistance is inserted into an annular groove between the resin portion 33 and the metal member 32.

Then, in step shown in FIG. 3(b), the igniter assembly 30 is disposed on the closure shell 13 so that the holder accommodation space 36a of the igniter assembly 30 is disposed over the opening 18 of the closure shell 13.

Then, in step shown in FIG. 3(c), the holder 40 is inserted into the opening 18, and the igniter assembly 30 is fixed to the bottom surface 13a of the closure shell 13. At this time, the first annular substrate 41 of the holder 40 is abutted against the bottom surface 13a (outer surface) 13a of the closure shell and fitted into the holder accommodation space 36a, while applying pressure to the two opposing hook portions 44, 45 such as to bring them closer to each other, and the second annular substrate 42 is fitted into the opening 18.

At this time, the concave portion 44c of the hook portion 44 and the concave portion 45c of the hook portion 45 are fitted onto the two convex portions 19a, 19b located on the circumferential surface of the opening 18, and the concave and convex portions of the two hook portions 44, 45 of the holder 40 are engaged with the convex and concave portions on the inner wall surface of the holder accommodation space 36a. Because a force to expand the hook portions outwardly is generated in the two hook portions 44, 45 that are squeezed together, the hook portions 44, 45 press against the inner wall surface of the holder accommodation space 36a, and the joining force produced by the engagement of the concave and convex portions is increased.

As a result, the igniter assembly 30 can be strongly fixed to the closure shell 13 only by the holder 40, without welding. Thus, because welding is not required, the assembling process can be simplified, and thermal deformation of the resin portion 33 of the igniter assembly 30 or combustion of the ignition agent of the igniter 31 caused by heat during welding is prevented.

The invention thus described, it will be obvious that the same may be varied in many ways. Such variation are not to be regarded as a departure from the spirit and scope of the invention, and all such modifications as would be obvious to one skilled in the art are intended to be included within the scope of the following claims.

The invention claimed is:

1. A gas generator, comprising:
   a housing having a gas discharge port;
   a combustion chamber accommodating a gas generating agent therein;
   a cylindrical filter disposed between the gas discharge port and the combustion chamber;
   an ignition device for igniting and combusting the gas generating agent, the ignition device having an igniter assembly that includes,
   an electric igniter,
   a metal member provided independently from the housing, and
   a resin portion that encloses the igniter and attaches the electric igniter to the metal member; the resin portion defining
   a holder accommodation space and placed on an inner surface of a bottom portion of the housing, such that the holder accommodation space is disposed over an opening formed in the bottom portion of the housing, an inner wall surface of the holder accommodation space having at least one of a concave portion and a convex portion; and the bottom portion; and
   a holder having at least one of a convex portion that engages the concave portion of the resin portion and a concave portion that engages the convex portion of the resin portion when the holder is inserted through the opening and into the holder accommodation space, such that the holder fixes the igniter assembly to the bottom portion of the housing without welding to the bottom portion of the housing.

2. The gas generator according to claim 1, wherein the holder has an annular substrate and hook portions provided to protrude in at least two locations on the annular substrate, the hook portions are made from an elastic material and have the concave portion and the convex portion, and distal end portions of the hook portions are provided to protrude and expand in the direction of an outer circumferential edge of the annular substrate;

the annular substrate of the holder is inserted from the outside into the opening formed in the bottom portion of the housing; and the concave and convex portions on the inner wall surface of the holder accommodation space and the convex and concave portions of the hook portions engage with each other, and a force that acts to expand outwardly the distal end sections of the hook portions applies pressure to the inner wall surface of the holder accommodation space.

3. The gas generator according to claim 1, wherein the holder has a first annular substrate, a second annular substrate that is formed on the first annular substrate and has a diameter smaller than that of the first annular substrate, and hook portions provided to protrude in at least two locations on the second annular substrate, the hook portions are made from an elastic material and have the concave portion and the convex portion, and distal end portions of the hook portions are provided to protrude and expand outwardly in the direction of an outer circumferential edge of the second annular substrate;

a step surface between the first annular substrate and the second annular substrate abuts against an outer surface of the bottom portion of the housing, and the second annular substrate is inserted into the opening formed in the bottom portion of the housing; and the concave and convex portions on the inner wall surface of the holder accommodation space and the convex and concave portions of the hook portions engage with each other, and a force that acts to expand outwardly the distal end sections of the hook portions applies pressure to the inner wall surface of the holder accommodation space.

4. The gas generator according to claim 1 or 2, further comprising:

a cup member that defines an agent accommodation chamber is provided, the cup member is disposed such that a closed end of the cup member abuts against a top surface of the housing, wherein a circumferential edge of an open end of the cup member abuts against the igniter collar.

5. A method of fixing an igniter assembly to a housing of a gas generator without employing a welding method, the method comprising:

preparing an igniter assembly having an electric igniter attached to a metal member, provided independently from the housing, by a resin portion defining a holder accommodation space, an inner wall surface of the holder accommodation space having at least one of a concave portion and a convex portion;

forming an opening for fixing the ignition device in a bottom portion of the housing;

preparing a holder having at least one of a convex portion that engages the concave portion of the resin portion and a concave portion that engages the convex portion of the resin portion;

placing the igniter assembly on an inner surface of the bottom portion of the housing, such that the holder accommodation space is disposed over the opening; and inserting the holder into the holder accommodation space through the opening from an outside of the bottom portion of the housing to engage the at least one of the concave portion and the convex portion of the holder with the at least one of the convex portion and the concave portion of the inner wall surface of the holder accommodation space to fix the igniter assembly to the inner surface of the bottom portion of the housing.

6. The method of fixing an igniter assembly according to claim 5, wherein as the holder, one having an annular substrate and hook portions provided to protrude in at least two locations on the annular substrate is used, the hook portions being made from an elastic material and having a concave portion and a convex portion, and distal end portions of the hook portions being provided to protrude and expand in the direction of an outer circumferential edge of the annular substrate;

in the inserting step, the holder is inserted so that the concave and convex portions on the inner wall surface of the holder accommodation space engage with the convex and concave portions of the hook portions, and a force that acts to expand outwardly the distal end sections of the hook portions applies pressure to the inner wall surface of the holder accommodation space.

7. The method of fixing an igniter assembly according to claim 5, wherein as the holder, one having a first annular substrate, a second annular substrate that is formed on the first annular substrate and has a diameter less than that of the first annular substrate, and hook portions provided to protrude in at least two locations on the second annular substrate is used, the hook portions being made from an elastic material and having a concave portion and a convex portion, and distal end portions of the hook portions being protruded so as to expand in the direction of an outer circumferential edge of the second annular substrate, in the inserting step, the holder is inserted so that a step surface between the first annular substrate and second annular substrate abut against an outer surface of the bottom portion of the housing and the concave and convex portions on the inner wall surface of the holder accommodation space and the convex and concave portions of the hook portions are engaged with each other, and a force that acts to expand outwardly the distal end sections of the hook portions applies pressure to the inner wall surface of the holder accommodation space.

8. The method for fixing an igniter assembly according to claim 5 or 6, further comprising:

after the inserting step, disposing a cup member that forms an agent accommodation chamber such that a closed end of the cup member abuts against a top surface of the housing and a circumferential edge of an open end of the cup member abuts against the igniter collar.

9. The gas generator according to claim 1, further comprising:

an O-ring provided between the resin portion and the bottom portion of the housing.

10. The method according to claim 5, further comprising:

placing an O-ring between the resin portion and the bottom portion of the housing.

* * * * *